(12) United States Patent
Jaura et al.

(10) Patent No.: US 7,172,831 B2
(45) Date of Patent: Feb. 6, 2007

(54) BATTERY SYSTEM FOR AUTOMOTIVE VEHICLE

(75) Inventors: Arun Kumar Jaura, Canton, MI (US); Chan-Woo Park, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 732 days.

(21) Appl. No.: 10/248,326

(22) Filed: Jan. 9, 2003

(65) Prior Publication Data
US 2004/0137313 A1 Jul. 15, 2004

(51) Int. Cl.
*H01M 2/00* (2006.01)
*H01M 10/50* (2006.01)
*H01M 2/36* (2006.01)

(52) U.S. Cl. .................. 429/72; 429/61; 429/62; 429/64; 429/120

(58) Field of Classification Search .............. 429/39, 429/61, 62, 64, 72, 120
See application file for complete search history.

(56) References Cited

U.S. PATENT DOCUMENTS

| 4,582,765 A | * | 4/1986 | Kothmann | .......... 429/13 |
| 5,571,630 A | | 11/1996 | Cheiky | |
| 5,753,384 A | | 5/1998 | Kimberg | |
| 5,904,999 A | | 5/1999 | Kimberg et al. | |
| 6,094,927 A | | 8/2000 | Anazawa et al. | |
| 6,138,466 A | * | 10/2000 | Lake et al. | .......... 62/199 |
| 6,372,378 B1 | | 4/2002 | Warner et al. | |
| 6,407,533 B1 | | 6/2002 | Bartek et al. | |
| 6,433,509 B2 | | 8/2002 | Kobayashi et al. | |

* cited by examiner

*Primary Examiner*—Patrick Joseph Ryan
*Assistant Examiner*—Ben Lewis
(74) *Attorney, Agent, or Firm*—David B. Kelley; Artz & Artz

(57) ABSTRACT

A battery system for an automotive vehicle includes a battery case having a number of battery cells housed within the case. Coolant passages extend about the battery cells, and a coolant pump or driver circulates coolant from the coolant supply through the passages so as to transfer heat from the battery cells to the coolant. A controller periodically reverses the direction of flow through the coolant passages so as to minimize the differential temperature arising between various cells of the battery stack.

20 Claims, 4 Drawing Sheets

BATTERY SYSTEM FOR AUTOMOTIVE VEHICLE

BACKGROUND OF INVENTION

1. Field of the Invention

The present invention relates to a method and system for achieving superior performance with a multi-cell battery which would typically be used with either a purely electric vehicle (EV), or a hybrid electric vehicle (HEV), or a fuel cell vehicle (FCV). The present method and system enhance battery performance by providing superior cooling, without the need for upsized cooling devices.

2. Disclosure Information

Traction batteries used in various EVs, HEVs. And FCVs are typically of the nickel metal hydride or lithium-ion construction. Such batteries offer the advantage of high energy density and the ability to rapidly recharge. Unfortunately, lithium-ion and nickel metal hydride batteries need careful temperature management to assure high performance and longer life with high efficiency. Because automotive vehicles must operate under ambient temperature extremes, temperature management presents problems. More specifically, the self-heating of battery cells due to parasitic energy loss when the batteries are being discharged or recharged must be managed carefully if the temperature is to be kept below the battery's maximum operational range. Moreover, uneven temperature conditions across a battery pack may cause individual changes in the electrochemical reaction characteristics of individual cells, which can affect the voltage and internal resistance of each cell, as well as its life. Although a battery system controller will attempt to regulate battery reaction uniformly between battery cells through balancing, the cell voltage across the battery system, an uneven temperature profile can cause non-homogeneous battery electric chemical reaction rates across the cell stack and result in accumulative degradation of battery cells. Moreover, it is known that excessive temperature will damage battery cells due to hyperactive chemical reaction rates.

Conventional battery cooling systems such as that disclosed in U.S. Pat. No. 6,407,533, use uni-directional coolant flow for battery cooling. In a uni-directional flow system, air, or some other heat transfer fluid, is introduced in at one boundary of a battery pack and discharged from the opposite boundary. The intake and discharge ports do not change function with time. In this sort of cooling arrangement, the greatest temperature differential, or $\Delta T$, between battery cells occurs between the inlet and outlet ends of the cooling path through the battery. Although the system of the '533 patent includes seasonal switching of airflow direction, no reciprocation occurs during normal operation in either the heating or cooling modes. As a result, the system of the '533 patent suffers from the deficiencies noted above.

The present inventors have determined that a battery temperature management system including the use of reciprocating or bi-directional heat transfer fluid flow for battery cooling and heating, in which the fluid flow is reversed after a predetermined time period will cause the time averaged temperature of the battery cells at both ends of the battery pack to be equal. And, if the period between successive flow reversals is optimized, the differential temperature between any two successive cells in the battery stack may be minimized to a very great extent. This will cause enhanced performance and life and efficiency of the battery stack because of the balanced usage of the battery cells.

Those skilled in the art will appreciate the profound utility of a system according to the present invention, particularly in the view of the fact that a temperature rise of only 10° C. will normally double the battery reaction rate. This is undesirable because higher rates at higher temperatures increase the rate of deterioration of the battery and may cause premature damage of battery cells and failure of the battery system itself.

SUMMARY OF INVENTION

A battery system for an automotive vehicle includes a battery case, a plurality of battery cells housed within the case, and a plurality of heat transfer passages extending about the battery cells within the case. A supply of heat transfer working fluid is circulated by at least one working fluid driver, with the working fluid driver being operated by a controller so as to periodically reverse the direction of the flow of heat transfer working fluid through the heat transfer passages. The heat transfer working fluid may comprise such fluids as ambient or conditioned air, or an aqueous based liquid such as those compositions commonly employed for the liquid cooling systems of automotive engines, or may comprise petroleum based liquids. Depending upon the type of heat transfer working fluid employed with a system according to the present invention, the working fluid driver may comprise either a pump such as an air pump or liquid pump, or a fan or blower incorporated into an air handling unit. Regardless of the type of fluid driver employed, various valves will be used to route fluid in the correct direction so as to achieve the fluid reversal which is characteristic of the present system.

Those skilled in the art will appreciate in view of this disclosure that the present system and method could be used not only to cool battery cells but also to control heating of battery cells for operation at lower ambient temperature conditions.

According to another aspect of the present invention, a method for cooling a battery system having a plurality of individual cells contained within a common battery case comprises the steps of circulating coolant in a first direction through a plurality of coolant passages extending about the cells for a first period of time, and circulating coolant in a second direction through the coolant passages for a second period of time. The durations of the first and second periods of time may be determined through an iterative process, and it is expected that the periods will normally be equal. In any event, the first and second periods of time will be adjusted until the temperature differential between the warmest cell and the coolest cell within the battery approaches a minimum value.

It is an advantage of the present thermal management system that it may be beneficially employed with all types of battery packs having cells which are subject to deleterious internal heating.

Other advantages, as well as objects and features of the present invention, will become apparent to the reader of this specification.

DETAILED DESCRIPTION

Figure 1:
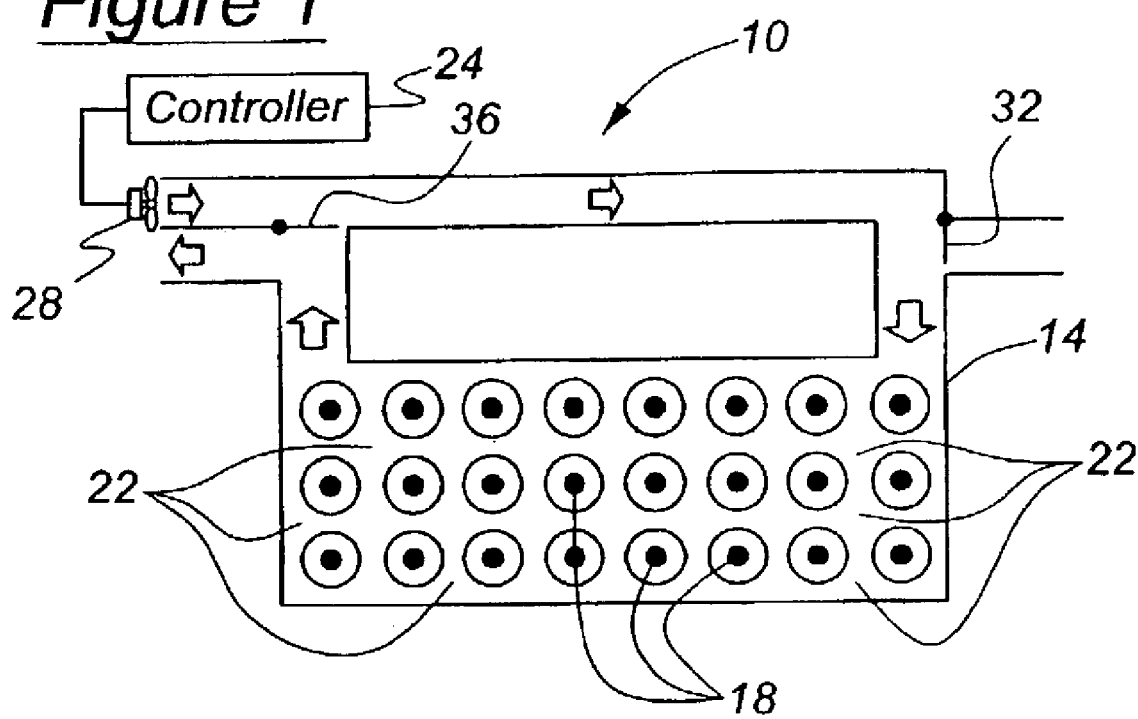
FIG. 1 is a schematic representation of a battery system having a reciprocating thermal management system according to the present invention.

As shown in FIG. 1, battery system 10 has battery case 14, with a plurality of cells 18 contained therein. As noted above, the individual cells may comprise lithium-ion or nickel metal hydride cells or other types of battery cells known to those skilled in the art and suggested by this disclosure and having the characteristic that the cells generate internal heat while operating in certain modes, so as to necessitate the use of external cooling to promote longevity and improve performance of the battery system. Accordingly, as used herein, the terms 'battery' and 'cell' mean any type of compartmentalized electrical energy storage device such as a capacitor, a lithium-ion unit, a nickel metal hydride unit, or yet other types of such energy storage devices. Battery system 10 has a plurality of heat transfer passages 22 through which coolant flows in response to pump work from working fluid driver 28. A single working fluid driver 28 is shown in FIG. 1. Driver 28 pushes fluid in the direction shown by the arrows in FIG. 1. The fluid flow direction is controlled in part by flow valve 32 and flow valve 36, which are positioned by controller 24. Thus, the cooling fluid circulates generally in a clockwise direction as seen in FIG. 1. The working fluid driver itself may be an axial pump or fan or centrifugal fan, or other types of devices useful for moving either gaseous or liquid coolant such as air and the previous mentioned aqueous and petroleum based liquids known to those skilled in the art and as suggested by this disclosure. Controller 24 monitors the temperature of the battery and operates the working fluid drivers and flow control valves so as to cause the flow of coolant to reverse according to a predetermined time schedule. The reservoir or source of the heat transfer working fluid is not shown, it being understood that the source may be drawn from any one of the ambient atmosphere, or a tank filled with another gas or liquid cooling or heating medium, or other types of heat transfer working fluids and sources known to those skilled in the art and suggested by this disclosure.

Figure 2:
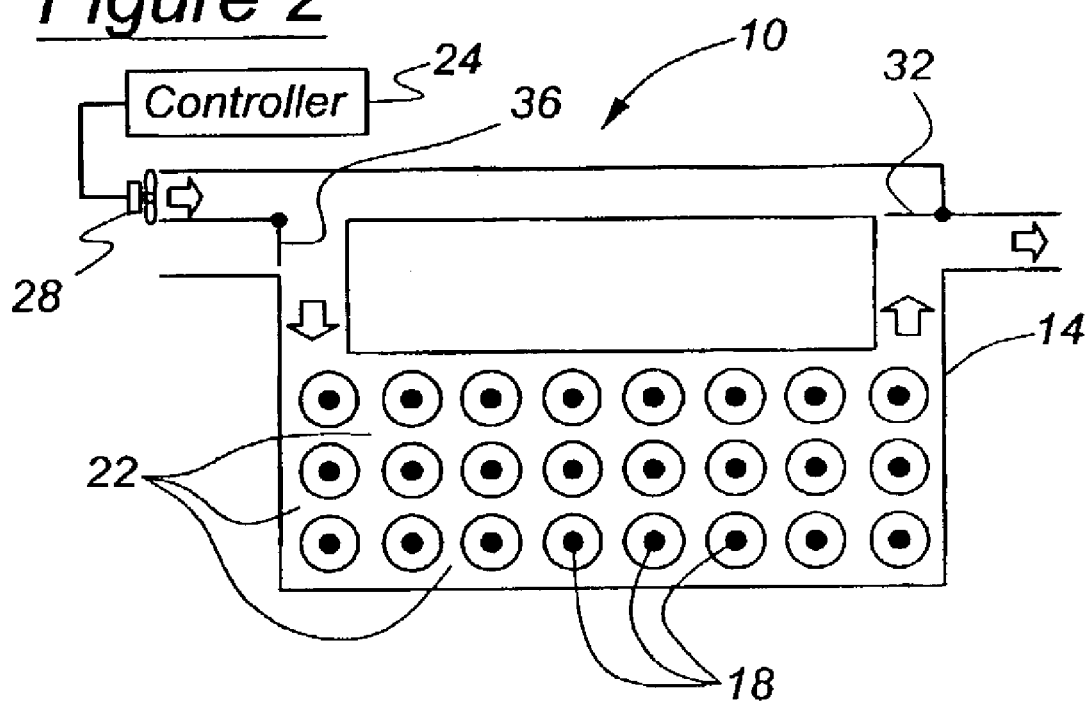
FIG. 2 is similar to FIG. 1 but shows flow of coolant in an opposite direction from the fluid flow direction of FIG. 1.

FIG. 2 is similar to FIG. 1, but flow valves 32 and 36 have been set by controller 24 to establish a generally counter-clockwise flow through heat transfer passages 22 past cells 18. In other words, the flow is reversed between FIGS. 1 and 2.

Figure 3:
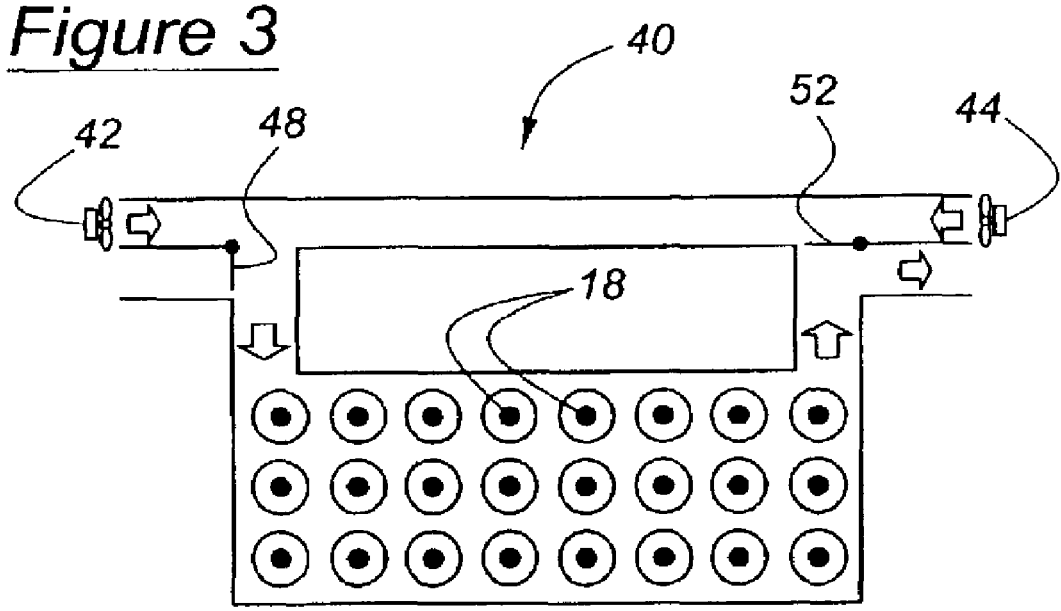
FIG. 3 shows a second variant of a battery having a reciprocating cooling system according to the present invention.
Figure 5:
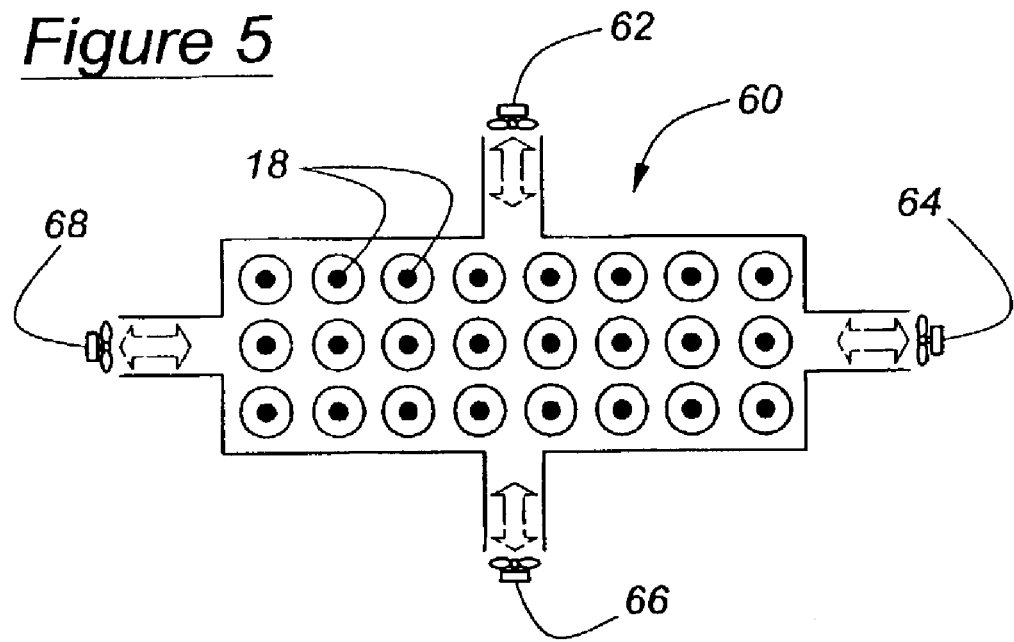
FIG. 5 illustrates another version of a battery having a cooling system with two-dimensional flow of heat transfer fluid according to the present invention.

FIG. 3 illustrates a second configuration for a battery system according to the present invention, in which two working fluid drivers, 42 and 44, are employed along with flow control valves 52 and 48, to permit reversible cooling flow. An advantage of the configuration shown in FIG. 3 resides in the fact that the inoperability of one of the working fluid drivers will not render the cooling system inoperable. This advantage is also available with the configuration of FIG. 5, which uses a four working fluid drivers 62, 64, 66, and 68, obviating the need for flow valves.

Figure 4:
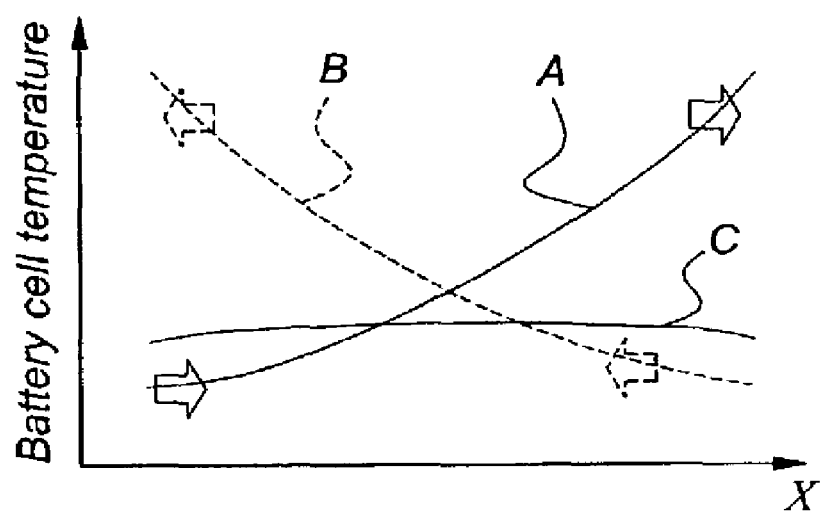
FIG. 4 illustrates temperature curves for batteries with and without a reciprocating heat transfer management system according to the present invention.
Figure 6:
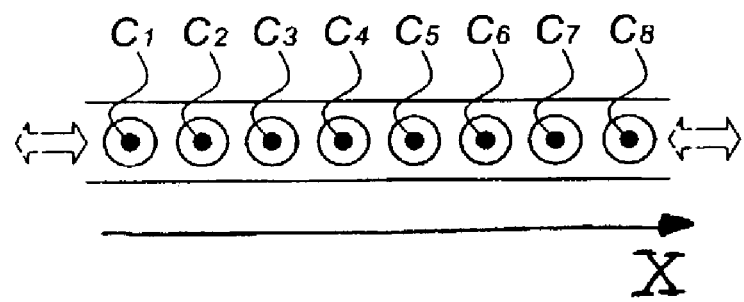
FIG. 6 illustrates a simplified battery useful for illustrating the temperature response characteristics of a system according to the present invention.

FIG. 4 graphically illustrates the advantage conferred by reversible flow cooling, in terms of battery cell temperature distribution as a function of distance across a battery stack, which is shown in an idealized form in FIG. 6. The battery of FIG. 6 has eight cells arranged in a linear configuration. Curve A of FIG. 4 shows the temperature distribution resulting in the battery of FIG. 6 from flow in a forward direction. Thus, curve A shows heating as the coolant flow progresses from left to right in the positive direction, X. Curve B shows the reverse flow situation, so that the highest temperature is achieved in the area of the cell stack at a different location. On the other hand, curve C shows the result of reciprocal or timed reversing cooling. Note that temperature C is much less than the maximum temperature obtained by uniflow cooling in curves A and B.

Figure 7:
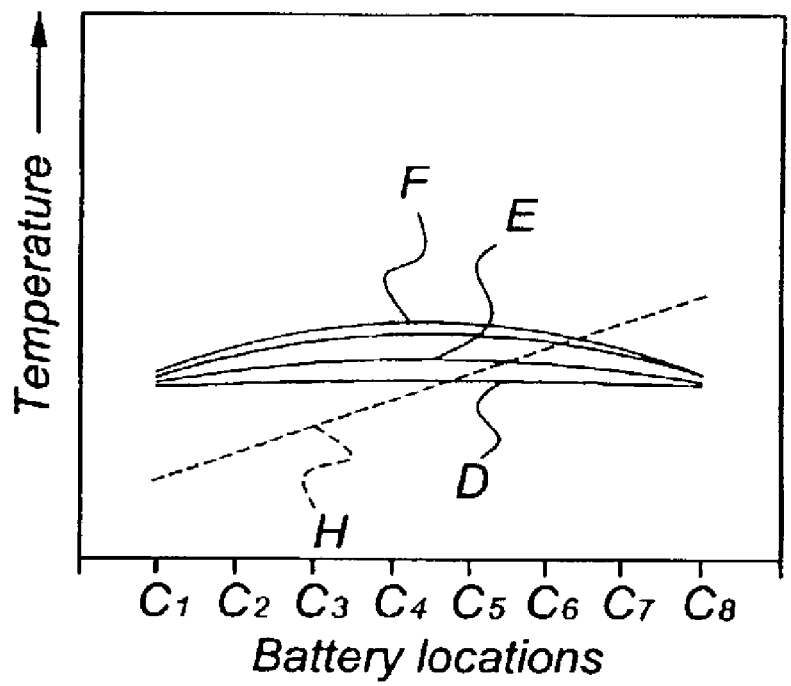
FIGS. 7 and 8 illustrate thermal performance versus time of a battery having a cooling system according to the present invention.

FIG. 7 illustrates the uniflow characteristic shown in FIG. 4, labeled as curve H, which simply ascends and dwells at a maximum temperature value. FIG. 7 also shows the effect on the cell temperatures of reversing flow (bi-directional flow). For example, curve D which shows the minimum change in average cell temperature across the range of cells from 1 to 8 in FIG. 6, was accomplished with a period of flow reversal of 2500 seconds at a typical operating condition. Curve E represents a period of flow reversal of 600 seconds, whereas curve F illustrates flow reversal at 30 seconds. Thus, for the idealized battery shown in FIG. 6, a reciprocation of cooling occurring at 2500 second intervals, will establish a minimum $\Delta t$ between the various cells within the cell stack.

Figure 8:
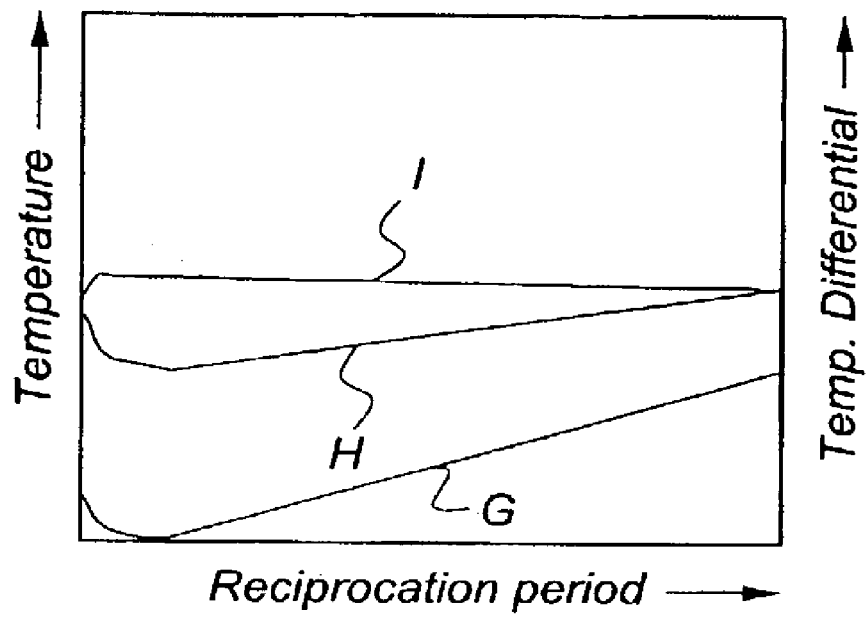

FIG. 8 illustrates temperature as a function of the flow reversal or flow reciprocation periods. Plot G illustrates temperature differential between the warmest and coolest cells as a function of reciprocation period. Thus, for the example of FIG. 6, the optimum period is clearly defined as the lowest value on the ordinate. Plots H and I of FIG. 8 show the time-averaged and absolute maximum temperature respectively of the cells as a function of the time reversal. Thus it is seen that according to curve H, the time-averaged maximum cell temperature is kept at a minimum at the same flow reversal period needed to achieve a minimum differential temperature between cells. And, curve I illustrates that the absolute maximum temperature is only weakly a function of the period according to which the flow is reversed.

At the point of use, the present system may be employed by determining either analytically, or through experimental data, the period of reciprocation needed to achieve the minimum differential temperature that between the various cells located within the battery. Of course, the minimum period may change in the event that the type of cell, or the heat transfer medium or fluid is changed, such as air being used as a coolant instead of a liquid, or other operating parameters, such as the magnitude of the current flow either into or out of the battery stack. The point, however, is that reciprocating cooling will reduce the temperature differential existing in the battery stack and thereby prolong the life and optimum performance of the battery stack.

Although the present invention has been described in connection with particular embodiments thereof, it is to be understood that various modifications, alterations, and adaptations may be made by those skilled in the art without departing from the spirit and scope of the invention. As noted above, those skilled in the art will appreciate in view of this disclosure that the precise reciprocation period which produces optimum results for any particular battery pack will be determinable by either iterative trials, or, where available, modeling. It is intended that the invention be limited only by the appended claims.

The invention claimed is:

1. A battery system for an automotive vehicle, comprising:
    a battery case;
    a plurality of battery cells housed within said case;
    a plurality of heat transfer passages extending about said battery cells;
    a supply of heat transfer working fluid;
    at least one working fluid driver for circulating said heat transfer working fluid from said supply and through said heat transfer coolant passages; and
    a controller for operating said at least one working fluid driver so as to periodically reverse the direction of the flow of heat transfer working fluid through said heat transfer passages.

2. A battery system according to claim 1, wherein said heat transfer working fluid comprises air.

3. A battery system according to claim 1, wherein said heat transfer working fluid comprises an aqueous based liquid.

4. A battery system according to claim 1, wherein said heat transfer working fluid comprises a petroleum based liquid.

5. A battery system according to claim 1, wherein said heat transfer working fluid comprises chilled air.

6. A battery system according to claim 1, wherein said heat transfer working fluid comprises a chilled aqueous based liquid.

7. A battery system according to claim 1, wherein said heat transfer working fluid comprises a chilled petroleum based liquid.

8. A battery system according to claim 1, wherein said heat transfer working fluid comprises heated air.

9. A battery system according to claim 1, wherein said heat transfer working fluid comprises a heated aqueous based liquid.

10. A battery system according to claim 1, wherein said heat transfer working fluid comprises a heated petroleum based liquid.

11. A battery system according to claim 1, wherein said working fluid driver comprises a pump.

12. A battery system according to claim 1, wherein said working fluid driver comprises an air handling unit.

13. A battery system according to claim 1, wherein said working fluid driver comprises a plurality of air handling units and a plurality of air valves.

14. A battery system according to claim 1, wherein said controller reverses the flow of heat transfer working fluid through the heat transfer passages as a function of time.

15. A battery system for an automotive vehicle, comprising:
    a battery case;
    a plurality of battery cells housed within said case;
    a plurality of coolant passages extending about said battery cells;
    a supply of coolant;
    at least one coolant driver for circulating said coolant from said supply and through said coolant passages, so as to transfer heat from said battery cells to said coolant; and
    a controller for periodically reversing the direction of the flow of said coolant through said coolant passages.

16. A method for cooling a battery system having a plurality of individual cells contained within a common battery case, comprising the steps of:
    circulating coolant in a first direction through a plurality of coolant passages extending about said cells, for a first period of time; and
    circulating coolant in a second direction through said coolant passages, for a second period of time.

17. A method according to claim 16, wherein said first period of time and said second period of time are equal.

18. A method according to claim 16, further comprising the step of adjusting said first and second periods of time until the temperature differential between the warmest cell and the coolest cell approaches a minimum value.

19. A method according to claim 18, wherein said first period of time and said second period of time are equal.

20. A method according to claim 16, wherein the durations of said first period of time and said second period of time are a function of at least the current flux across the battery system.

* * * * *